US011243922B2

(12) United States Patent
Xu et al.

(10) Patent No.: US 11,243,922 B2
(45) Date of Patent: Feb. 8, 2022

(54) METHOD, APPARATUS, AND STORAGE MEDIUM FOR MIGRATING DATA NODE IN DATABASE CLUSTER

(71) Applicant: Tencent Technology (Shenzhen) Company Limited, Shenzhen (CN)

(72) Inventors: Zhongqing Xu, Shenzhen (CN); Sen Hu, Shenzhen (CN); Yuesen Li, Shenzhen (CN); Yuhong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 234 days.

(21) Appl. No.: 16/276,168

(22) Filed: Feb. 14, 2019

(65) Prior Publication Data

US 2019/0179808 A1    Jun. 13, 2019

Related U.S. Application Data

(63) Continuation of application No. PCT/CN2017/113563, filed on Nov. 29, 2017.

(30) Foreign Application Priority Data

Dec. 1, 2016   (CN) .......................... 201611090677.4

(51) Int. Cl.
*G06F 16/00* (2019.01)
*G06F 16/21* (2019.01)
*G06F 11/14* (2006.01)

(52) U.S. Cl.
CPC ........ *G06F 16/214* (2019.01); *G06F 11/1451* (2013.01); *G06F 2201/80* (2013.01); *G06F 2201/84* (2013.01)

(58) Field of Classification Search
None
See application file for complete search history.

(56) References Cited

U.S. PATENT DOCUMENTS 8,229,945 B2 * 7/2012 Dinker ............... G06F 12/0842
707/764
8,667,001 B2 * 3/2014 Dinker .................... G06F 16/27
707/764

(Continued)

FOREIGN PATENT DOCUMENTS

CN        101079902 A      11/2007
CN        101079902 A      11/2007

(Continued)

OTHER PUBLICATIONS

Office Action dated Dec. 3, 2019 for Chinese Application No. 201611090677.4 with concise English Translation, 8 pages.

(Continued)

*Primary Examiner* — Farhan M Syed
(74) *Attorney, Agent, or Firm* — Crowell & Moring LLP

(57) ABSTRACT

The present disclosure is related to a method and an apparatus for data migration in a database cluster. The method includes obtaining a snapshot of a source data node and recording incremental data in a to-be-migrated data shard in the source data node according to inventory data. The method includes migrating the inventory data to a target data node. The method also includes migrating the incremental data, and during the migration when the unmigrated incremental data satisfies a preset write-lock condition, instructing the source data node to perform a write-lock operation on the to-be-migrated data shard and migrate unmigrated incremental data to the target data node. The method further includes, after the migration of the incremental data is completed, instructing a coordinator node to switch a route (Continued)

corresponding to the to-be-migrated data shard from the source data node to the target data node.

15 Claims, 10 Drawing Sheets

(56) References Cited

U.S. PATENT DOCUMENTS

| | | | | |
|---|---|---|---|---|
| 10,362,092 | B1* | 7/2019 | Parthasarathy | H04L 67/28 |
| 10,417,190 | B1* | 9/2019 | Donlan | G06F 16/10 |
| 10,671,496 | B2* | 6/2020 | Horowitz | G06F 16/2358 |
| 10,698,775 | B2* | 6/2020 | Horowitz | G06F 11/1448 |
| 2009/0240664 | A1* | 9/2009 | Dinker | G06F 16/27 |
| 2012/0137367 | A1* | 5/2012 | Dupont | G06F 21/00 |
| | | | | 726/25 |
| 2012/0259889 | A1* | 10/2012 | Dinker | G06F 12/0866 |
| | | | | 707/769 |
| 2014/0096249 | A1* | 4/2014 | Dupont | G06F 21/552 |
| | | | | 726/23 |
| 2016/0357778 | A1* | 12/2016 | MacKenzie | G06F 16/178 |
| 2017/0177222 | A1* | 6/2017 | Singh | G06F 9/45558 |
| 2017/0344290 | A1* | 11/2017 | Horowitz | G06F 3/065 |
| 2017/0344441 | A1* | 11/2017 | Horowitz | G06F 11/3006 |
| 2018/0039412 | A1* | 2/2018 | Singh | G06F 3/0685 |
| 2020/0210069 | A1* | 7/2020 | Singh | H04L 67/1097 |
| 2020/0285549 | A1* | 9/2020 | Horowitz | G06F 11/3006 |
| 2020/0301787 | A1* | 9/2020 | Cabral | G06F 9/5016 |
| 2020/0327021 | A1* | 10/2020 | Horowitz | G06F 11/1448 |

FOREIGN PATENT DOCUMENTS

| | | |
|---|---|---|
| CN | 103067433 A | 4/2013 |
| CN | 103294675 A | 9/2013 |
| CN | 104348862 A | 2/2015 |
| CN | 105472045 A | 4/2016 |
| CN | 105528368 A | 4/2016 |
| CN | 105718570 A | 6/2016 |
| CN | 105528368 B | 3/2019 |
| WO | WO2015014152 A1 | 2/2015 |

OTHER PUBLICATIONS

International Search Report received for PCT Application No. PCT/CN2017/113563 dated Feb. 24, 2018 (with brief English translation), 6 pages.

Written Opinion received for PCT Application No. PCT/CN2017/113563 dated Feb. 24, 2018 (Chinese), 3 pages.

* cited by examiner

METHOD, APPARATUS, AND STORAGE MEDIUM FOR MIGRATING DATA NODE IN DATABASE CLUSTER

RELATED APPLICATION

This application claims priority to PCT Patent Application No. PCT/CN2017/113563, filed on Nov. 29, 2017, which claims priority to Chinese Patent Application No. 201611090677.4, filed with the Chinese Patent Office on Dec. 1, 2016, both of which are incorporated by reference in its entirety.

FIELD OF THE TECHNOLOGY

This application relates to the field of computer technologies, and specifically, to a method and an apparatus for data migration in a database cluster, and a storage medium.

BACKGROUND OF THE DISCLOSURE

When user access traffic of a specific application is relatively high, using only one server to provide a database service for users certainly will affect user experience. In this case, a plurality of servers is needed to provide a database service for users together, and therefore, forms a so-called database cluster.

As the user access traffic gradually increases, a storage capability and a processing capability of the database cluster would also reach upper limits of clustering capabilities. In this case, it is needed to alleviate storage pressure and load pressure on original servers in a data migration manner.

SUMMARY

Embodiments of this disclosure provide a method and an apparatus for data migration in a database cluster, and the embodiments of the present disclosure employ the following technical solutions:

This application provides a method for data migration in a database cluster. The method includes obtaining, by a device comprising a memory and a processor in communication with the memory, a snapshot of a source data node of a database cluster. The method includes recording, by the device, incremental data in a to-be-migrated data shard in the source data node according to inventory data that is backed up in the snapshot and that is in the to-be-migrated data shard. The method includes migrating, by the device, the inventory data to a target data node of the database cluster. The method also includes migrating, by the device, the incremental data, and during migrating the incremental data when unmigrated incremental data satisfies a preset write-lock condition, instructing the source data node to perform a write-lock operation on the to-be-migrated data shard and migrate the unmigrated incremental data to the target data node. The method further includes, after the migrating the incremental data is completed, instructing, by the device, a coordinator node of the database cluster to switch a route corresponding to the to-be-migrated data shard from the source data node to the target data node.

The present disclosure also describes an apparatus for data migration in a database cluster. The apparatus includes a memory storing instructions and a processor in communication with the memory. When the processor executes the instructions, the processor is configured to cause the apparatus to obtain a snapshot of a source data node of a database cluster and record incremental data in a to-be-migrated data shard in the source data node according to inventory data that is backed up in the snapshot and that is in the to-be-migrated data shard. When the processor executes the instructions, the processor is configured to cause the apparatus to migrate the inventory data to a target data node of the database cluster. When the processor executes the instructions, the processor is configured to also cause the apparatus to migrate the incremental data and during migrating the incremental data when unmigrated incremental data satisfies a preset write-lock condition, instruct the source data node to perform a write-lock operation on the to-be-migrated data shard and migrate the unmigrated incremental data to the target data node. When the processor executes the instructions, the processor is configured to further cause the apparatus to, after the migrating the incremental data is completed, instruct a coordinator node of the database cluster to switch a route corresponding to the to-be-migrated data shard from the source data node to the target data node.

The present disclosure further describes a non-transitory computer readable storage medium. The non-transitory computer readable storage medium stores instructions. The instructions, when executed by a processor, cause the processor to perform obtaining a snapshot of a source data node of a database cluster and recording incremental data in a to-be-migrated data shard in the source data node according to inventory data that is backed up in the snapshot and that is in the to-be-migrated data shard. The instructions, when executed by a processor, cause the processor to perform migrating the inventory data to a target data node of the database cluster. The instructions, when executed by a processor, also cause the processor to perform migrating the incremental data and during migrating the incremental data when unmigrated incremental data satisfies a preset write-lock condition, instructing the source data node to perform a write-lock operation on the to-be-migrated data shard and migrate the unmigrated incremental data to the target data node. The instructions, when executed by a processor, further cause the processor to perform, after the migrating the incremental data is completed, instructing a coordinator node of the database cluster to switch a route corresponding to the to-be-migrated data shard from the source data node to the target data node.

BRIEF DESCRIPTION OF THE DRAWINGS

The accompanying drawings, which are incorporated herein and constitute a part of this specification, illustrate embodiments consistent with the present disclosure and, together with the specification, serve to explain the principles of the embodiments present disclosure.

FIG. 7b is a schematic diagram of data node addition included in FIG. 7a;

Figure 1:
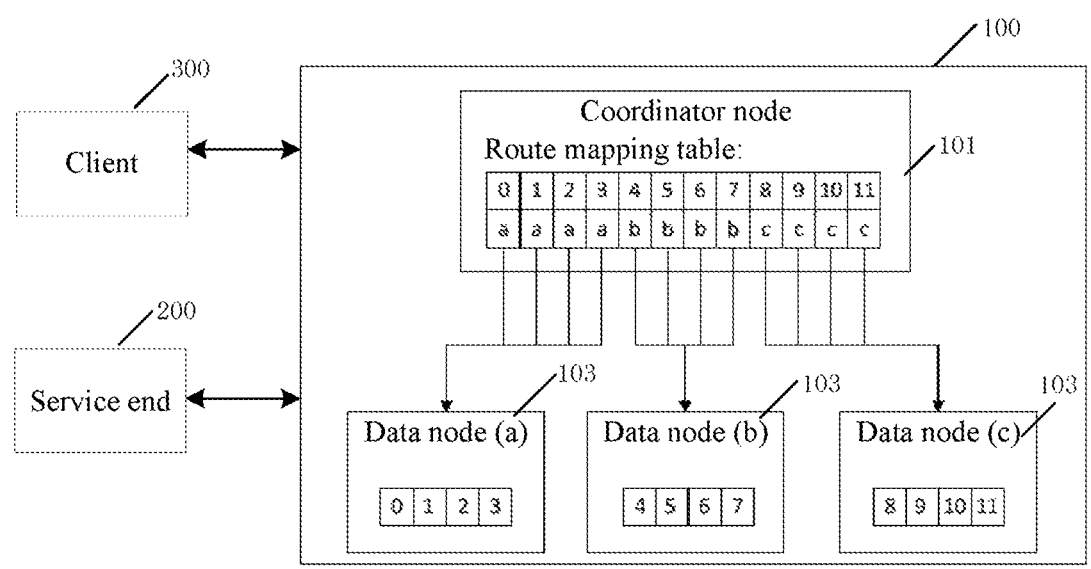
FIG. 1 is a schematic diagram of a related implementation environment according to an embodiment of the present disclosure.

Explicit embodiments in the embodiments of the present disclosure are shown by using the foregoing accompanying drawings, more detailed descriptions are provided below. The accompanying drawings and literal descriptions are not intended to limit the scope of the idea of the embodiments of the present disclosure in any manner, but explain the concept of the embodiments of the present disclosure by referring to specific embodiments for a person skilled in the art.

DESCRIPTION OF EMBODIMENTS

Exemplary embodiments are described below in detail, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the embodiments of the present disclosure. On the contrary, the implementations are merely examples of apparatuses and methods that are described in detail in the appended claims and that are consistent with some aspects of the embodiments of the present disclosure.

As stated above, as user access traffic gradually increases, a database cluster needs to alleviate storage pressure and load pressure on original servers in a data migration manner. However, in an existing data migration process, access of a client to data that is being migrated needs to be stopped. To be specific, a database service needs to be stopped, so as to ensure consistency of data migration. This certainly affects access efficiency of users, and results in poor access experience of the users.

The present disclosure is directed toward addressing one or more existing drawbacks, including but not limited to those set forth above.

To address existing drawbacks, the present disclosure improves data migration in database cluster, which is an improvement in the computer technology. The present disclosure teaches that inventory data may be migrated from a source data node to a target data node. While allowing users to continue data access to the inventory data, the changes to the inventory data may be recorded as incremental data. The incremental data may be migrated to the target node. During the migration of incremental data, depending on whether a preset write-lock condition is satisfied, the source data node may perform a write-lock operation. The preset write-lock condition may relate to the time duration of migration of un-migrated incremental data, thus, when the time duration is relatively short, even though the source data node perform the write-lock operation, users accessing database cluster will not be noticeable affected.

Currently, universal databases include a key-value database, a PostgreSQL-based database, and the like.

For the key-value database, functions, such as data migration that is almost unperceived by users and data rebalancing, can be implemented by using a multi-copy mechanism. However, because the key-value database neither supports complete data transactions (ACID), nor possesses a distributed transaction capability, an application needs to ensure transactions in terms of service logic, to further ensure consistency of data migration. However, this is unacceptable to most application developers. In addition, the multi-copy mechanism is merely applicable to implement internal data migration between homogenous databases, and cannot implement data migration between heterogeneous databases.

Based on this, the PostgreSQL-based database is widely used. For example, open source database clusters Postgres-xc, Postgres-x1, Postgres-x2, and the like have capabilities of automatic data distribution and automatic data aggregation. In a data migration process, particularly, for a database cluster capacity expansion scenario, migration of partial data cannot be implemented, and only after a full volume of all data on original servers is exported, the all data exported is imported into an added server, so as to redistribute data. However, in such a data migration solution, a database service needs to be stopped to ensure consistency of data migration. If a data volume on the original servers is large, consequently, a time in which the database service is stopped is very long, seriously affecting access efficiency of users.

For another example, PostgreSQL-based database middleware pg_shard and PostgreSQL-based database middleware citusdata possess a data sharding capability and can implement migration of partial data by migrating shards. However, in a data migration process, a database service still needs to be stopped. To be specific, access of a client to data that is being migrated is stopped, thereby ensuring consistency of data migration.

Therefore, to prevent a database service from being interrupted in a data migration process, a method for data migration in a database cluster is specifically provided. To address existing drawbacks, the present disclosure improves data migration in database cluster, which is an improvement in the computer technology. The present disclosure teaches that inventory data may be migrated from a source data node to a target data node. While allowing users to continue data access to the inventory data, the changes to the inventory data may be recorded as incremental data. The incremental data may be migrated to the target node. During the migration of incremental data, depending on whether a preset write-lock condition is satisfied, the source data node may perform a write-lock operation. The preset write-lock condition may relate to the time duration of migration of un-migrated incremental data, thus, when the time duration is relatively short, even though the source data node perform the write-lock operation, users accessing database cluster will not be noticeable affected.

FIG. 1 is an implementation environment related to the foregoing method for data migration in a database cluster. The implementation environment includes a database cluster 100, a service end 200, and a client 300.

The database cluster 100 is constituted by several servers. The foregoing database cluster 100 includes at least one server as a coordinator node 101 and several servers as data nodes 103. The coordinator node 101 provides automatic data distribution and automatic data aggregation for the client 300. The data nodes 103 are configured to store accessible data. In this application, any one data node 103 not only can serve as a source data node, but also can serve as a target data node. Without loss of generality, a data node where data that needs to be migrated is located is referred to as a source data node, and a data node into which the data is about to be migrated is referred to as a target data node.

The coordinator node 101 is responsible for receiving a write operation performed by the client 300, and importing to-be-written data corresponding to the write operation into a data shard owned by a data node 103 in the database cluster 100. To be specific, a shard number of the to-be-written data is calculated according to a preset rule (such as a hash algorithm or a route algorithm), a data node 103 corresponding to the shard number is found by looking up a preset route mapping table, and further the to-be-written data is forwarded to the data shard owned by the data node 103 for storage.

When a user performs data access, that is, the client 300 queries data in the database cluster 100, the coordinator node 101 calculates a shard number of to-be-queried data according to a query condition, finds a data node 103 corresponding to the shard number by looking up a preset route mapping table, and further finds the to-be-queried data from a data shard owned by the one or more data nodes 103 and sends it back to the client 300.

When a storage capability and a processing capability of the database cluster 100 reach upper limits of clustering capabilities of the cluster, the service end 200 controls, by means of interaction between the coordinator node 101 and the data node 103 in the database cluster 100, the database cluster 100 to perform data migration. For example, data in a data shard whose shard number is 0 is migrated from a data node a to a data node c, to alleviate storage pressure and load pressure on the data node a.

The service end 200 may be built in the database cluster 100, or disposed independently of the database cluster 100. The client 300 is an application client.

Figure 2:
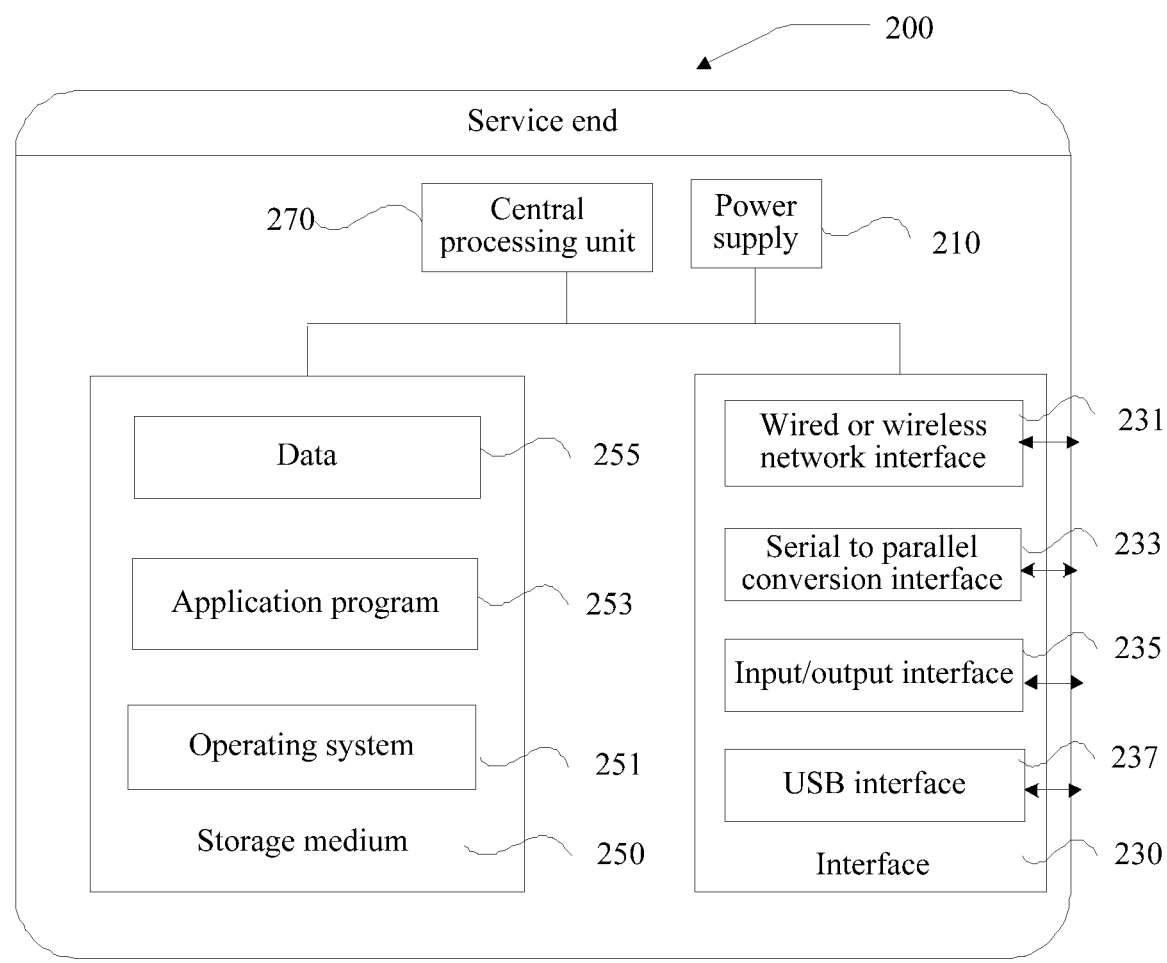
FIG. 2 is a block diagram of a service end according to an exemplary embodiment.

FIG. 2 is a block diagram of a service end according to an exemplary embodiment. This hardware structure is merely an example to which this embodiment of the present disclosure is applicable, and neither ca be considered as any limitation to a use scope of this embodiment of the present disclosure, nor can be explained as that this embodiment of the present disclosure needs to depend on the service end 200.

The service end 200 may greatly differs because configuration or performance differs. As shown in FIG. 2, the service end 200 includes a power supply 210, interfaces 230, at least one storage medium 250, and at least one central processing unit (CPU) 270.

The power supply 210 is configured to provide a working voltage for respective hardware devices on the service end 200.

The interfaces 230 include at least one wired or wireless network interface 231, at least one serial to parallel conversion interface 233, at least one input/output interface 235, at least one USB interface 237, and the like, configured to communicate with an external device.

The storage medium 250 serves as a carrier of resource storage and may be a random storage medium, a magnetic disk, an optical disc, or the like, and a resource stored thereon includes an operating system 251, an application program 253, data 255, and the like. A storage manner may be transient storage or permanent storage. The operating system 251 is used for managing and controlling respective hardware devices on the service end 200 and the application program 253, to implement calculation and processing of the CPU 270 on massive data 255, and may be Windows Server™, Mac OS X™, Unix™, Linux™, FreeBSD™, or the like. The application program 253 is a computer program that is based on an operating system 251 and that implements at least one particular task, and may include at least one module (not shown in the figure), where each module may include a series of operation instructions for the service end 200. The data 255 may be a file, a picture, and the like stored in a magnetic disk.

The CPU 270 may include one or more processors, is set to communicate with the storage medium 250 through a bus, and is configured to perform operation and processing on the massive data 255 in the storage medium 250. As specifically described above, the service end 200, to which this embodiment of the present disclosure is applicable, controls a database cluster to perform data migration. To be specific, data migration in the database cluster is implemented in a form of reading a series of operation instructions stored in the storage medium 250 by using the CPU 270, to resolve a problem that a database service needs to be stopped in a data migration process in the existing technology.

In addition, the embodiments of the present disclosure may also be implemented by using a hardware circuit e or a hardware circuit in combination with software instructions. Therefore, implementation of the embodiments of the present disclosure is not limited to any particular hardware circuit, software, or a combination thereof.

Figure 3:
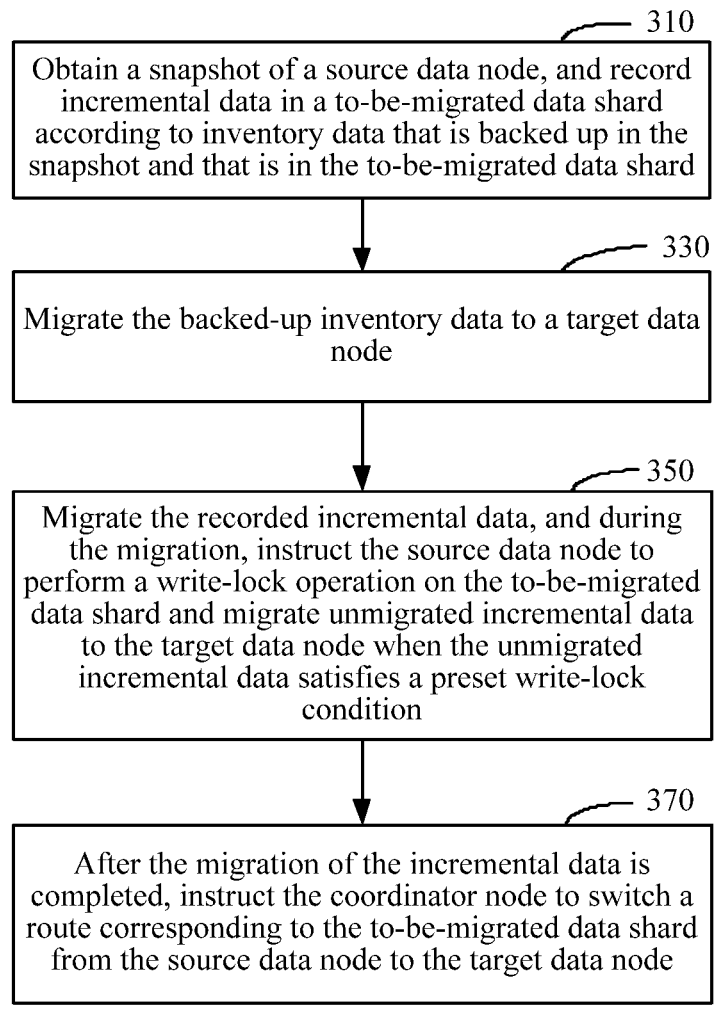
FIG. 3 is a flowchart of a method for data migration in a database cluster according to an exemplary embodiment.

Referring to FIG. 3, in an exemplary embodiment, a method for data migration in a database cluster is applicable to the service end 200 in the implementation environment shown in FIG. 1. Such a method for data migration in a database cluster can be implemented by using the service end 200 and may include the following steps:

Step 310: Obtain a snapshot of a source data node, and record incremental data in a to-be-migrated data shard according to inventory data that is backed up in the snapshot and that is in the to-be-migrated data shard.

It should be understood that when data in a data node is much more than that in the remaining data nodes, that is, when a data skew occurs in a database cluster, to distribute data in respective data nodes more uniformly, data migration may be performed, that is, data is migrated from a data node with higher load pressure (that is, user access traffic is higher) to a data node with lower load pressure (that is, user access traffic is lower).

For another example, when a storage capability and a processing capability of the database cluster reach upper limits of clustering capabilities, the clustering capabilities of the database cluster can be improved in a manner of adding a data node. In this case, data migration also needs to be performed to reduce alleviate storage pressure and load pressure on the original data nodes in the database cluster.

Hence, the service end can determine whether the database cluster needs to perform data migration by monitoring a running status of the database cluster. The running status of the database cluster may be represented by a load capability (that is, user access traffic) of each data node in the database cluster, or may be presented by a CPU usage ratio of each data node in the database cluster.

For example, if it is detected that user access traffic of a specific data node in the database cluster is much higher than that of the remaining data nodes, indicating that a data skew occurs in the database cluster, it is determined that the database cluster needs to perform data migration. Alternatively, if it is detected that CPU usage ratios of all data nodes in the database cluster exceeds a preset threshold (for example, 80%), indicating that a clustering capability of the database cluster reaches an upper limit, it is determined that the database cluster needs to perform data migration.

During a data migration process, a database service is not stopped, and a client may still a write operation on data in a data shard in a data node. For example, the write operation includes data addition, data deletion, data modification, and the like. Based on this, the data migration includes migration of inventory data and migration of incremental data. The inventory data is data before data migration is performed, and the incremental data is new data generated because of a write operation in a data migration process or inventory data that is modified because of a write operation.

The snapshot is defined to be a copy of data in a specified data set, and the copy includes an image of the data at a specific time point (for example, a time point when copying is started). In this embodiment, the snapshot is obtained by using the source data node to distinguish inventory data and incremental data in a to-be-migrated data shard in the source data node. In this way, the foregoing to-be-migrated data shard can be located on the source data node.

In one embodiment, a snapshot of a whole source data node may be obtained. In other embodiment, a snapshot of a portion of the whole source data node may be obtained, which may save resources of obtaining a snapshot. The resources may include time or intermediate storage spaces.

Specifically, at a time point when data migration is ready to be performed, all data in a data shard owned by the source data node is copied, to obtain a snapshot of the source data node. Correspondingly, data that is backed up in the snapshot of the source data node includes inventory data in to-be-migrated data shard. Based on the inventory data in the to-be-migrated data shard, in a data migration process, all write operations performed on the to-be-migrated data shard are recorded, to generate incremental data in the to-be-migrated data shard. In other words, in the data migration process, any data different from the inventory data in the to-be-migrated data shard is considered as incremental data in the migration data shard.

Further, the incremental data may be recorded in several log files, to facilitate subsequent migration of the incremental data.

Step 330: Migrate the backed-up inventory data to a target data node.

After the snapshot of the source data node is obtained, the inventory data that is backed up in the snapshot and that is in the to-be-migrated data shard can be obtained, so as to perform migration of the inventory data based on the inventory data.

The migration of the inventory data may be direct migration from the source data node migration to the target data node, or may be first importing the inventory data from the source data node into a preset storage space, and then, exporting the inventory data from the preset storage space to the target data node.

Using the direct migration as an example, a continuous connection is established between the source data node and the target data node, and the inventory data is transmitted from the source data node to the target data node through the connection.

Step 350: Migrate the recorded incremental data, and during the migration, instruct the source data node to perform a write-lock operation on the to-be-migrated data shard and migrate unmigrated incremental data to the target data node when the unmigrated incremental data satisfies a preset write-lock condition.

After the migration of the inventory data is completed, migration of the incremental data can be performed.

It should be mentioned that because the migration of the incremental data is performed after the migration of the inventory data, that is, when the migration of the incremental data is performed, the target data node has stored the inventory data, and incremental data is new data generated because of a write operation in a data migration process or inventory data that is modified because of a write operation, migrating the incremental data to the target data node is actually renewing incremental data according to a write operation corresponding to the incremental data on the target data node.

For example, if the incremental data is new data generated because of a write operation, corresponding new data is generated on the target data node; and if the incremental data is inventory data that is modified because of a write operation, the target data node correspondingly modifies the inventory data stored thereon, so as to generate modified inventory data.

Further, the migration of the incremental data may be direct migration from the source data node migration to the target data node, or may be first importing the inventory data from the source data node into a preset storage space, and then, exporting the inventory data from the preset storage space to the target data node.

Using the direct migration as an example, a continuous connection is established between the source data node and the target data node, and the incremental data is transmitted from the source data node to the target data node through the connection. In addition, because a speed at which the source data node generates incremental data may be inconsistent with a speed at which the target node renews the incremental data, that is, read and write speeds of the incremental data are consistent from each other, the connection has a capability of buffering a specific volume of data, to adapt to an application scenario where read and write speeds of the incremental data are consistent, thereby improving applicability of the migration of the incremental data.

It be may understood that because a database service is not stopped in a data migration process, the client sill performs a write operation on data in the to-be-migrated data shard in the source data node. If the write operation on the to-be-migrated data shard in the source data node is not locked, incremental data is continuously generated, and full migration of incremental data cannot be ensured.

Therefore, in a migration process, whether a write-lock operation needs to be performed on the to-be-migrated data shard is determined by determining whether unmigrated incremental data satisfies a write-lock condition.

At any given time point during the migration of incremental data, there is a first portion of incremental data which has been migrated to the target data node. This first portion may be named as migrated incremental data. There is also a second portion of incremental data which has not been migrated to the target data node. This second portion of incremental data may be named as unmigrated incremental data.

The write-lock operation may result in a failure or a blockage of a write operation performed by a client on the to-be-migrated data shard. Therefore, the preset write-lock condition is preset according to how to prevent the client from perceiving a write operation failure or blockage. For example, the preset write-lock condition may be a data volume of unmigrated incremental data, a renewal time of unmigrated incremental data, and the like. It could be understood that if the data volume of the unmigrated incremental data is extremely small, or the renewal time of the unmigrated incremental data is extremely short, the client can be prevented from perceiving a write operation failure or blockage in a data migration process.

If the unmigrated incremental data does not satisfy the preset write-lock condition, while the migration of the incremental data is continuously performed, the write operation performed by the client on the data in the to-be-migrated data shard is maintained.

Otherwise, if the unmigrated incremental data satisfies the preset write-lock condition, the source data node is instructed to perform a write-lock operation on the to-be-migrated data shard. In this case, a new write operation performed by the client on the to-be-migrated data shard fails or is blocked, and the write operation previously performed is still continued. Based on this, after it is waited for all of the previous write operations on the to-be-migrated data shard are completed, the unmigrated incremental data is migrated to the target data node, to ensure completeness of the migration of the incremental data migration.

Step 370: After the migration of the incremental data is completed, instruct the coordinator node to switch a route corresponding to the to-be-migrated data shard from the source data node to the target data node.

After coordinator node completes switching of a route corresponding to the to-be-migrated data shard, read and write operations performed by the client on the data in the to-be-migrated data shard are switched from the source data node to the target data node. So far, data migration is completed.

In the process as stated above, data migration that is unperceived by a client is implemented, to prevent a database service in a data migration process from being interrupted, thereby effectively improving access efficiency of users and improving access experience of the users.

In addition, the foregoing method for data migration in a database cluster not only can support complete data transactions, to ensure consistency of data migration, but also can support data migration between heterogeneous databases, thereby effectively extending an application scenario of data migration.

Figure 4:
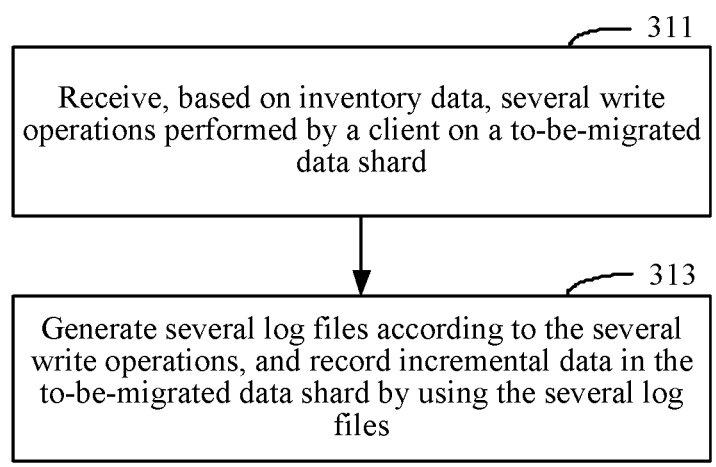
FIG. 4 is a flowchart of a step of recording incremental data in a to-be-migrated data shard according to inventory data that is backed up in the snapshot and that is in the to-be-migrated data shard corresponding to the embodiment of FIG. 3 in an embodiment.

Referring FIG. 4, in an exemplary embodiment, step 310 may include the following steps:

Step 311: Receive, based on the inventory data, several write operations performed by a client on the to-be-migrated data shard.

As stated above, correspondingly, data that is backed up in the snapshot of the source data node includes inventory data in to-be-migrated data shard. The snapshot of the source data node is generated at a time point when data migration is ready to be performed.

Therefore, based on the inventory data, that is, after the time point when data migration is ready to be performed, all of the write operations performed by the client on the to-be-migrated data shard are recoded, to facilitate subsequent renewal of incremental data on the target node according to all of the write operations.

Step 313: Generate several log files according to the several write operations, and record incremental data in the to-be-migrated data shard by using the several log files.

It should be understood that a data volume of incremental data recorded in each log file is limited. In this embodiment, all of the write operations are recorded in several log files, so as to form incremental data in the to-be-migrated data shard by using the several log files. To be specific, the target data node can renew incremental data according to all of the write operation recorded in the several log files, so as to implement migration of the incremental data in to-be-migrated data shard, thereby ensuring consistency of data migration.

Further, in each log file, a threshold is set for a data volume of recorded incremental data. For example, if the threshold is set to recording 100 pieces of incremental data, when a data volume of incremental data generated in a same write operation exceeds the threshold, the write operation is recorded in at least two log files. In another example, when a data volume of incremental data generated in a same write operation does not exceed the threshold, a same log file records incremental data generated by means of at least two write operations, thereby ensuring storage efficiency of the log file.

Correspondingly, in step 350, the step of migrating the recorded incremental data may include the following step:

performing iterative migration of the incremental data by switching the several log files.

As stated above, when the incremental data is directly migrated, a continuous connection needs to be established between the source data node and the target data node, and because a speed at which the source data node generates incremental data may be inconsistent with a speed at which the target node renews the incremental data, the connection also needs to have a capability of buffering a specific volume of data.

Not only the database cluster needs to maintain a whole life cycle of the connection, resulting in invasion to kernel code of the database cluster, but also the data buffering capability possessed by the connection needs to occupy a storage space of the database cluster. Consequently, in a long process of data stream transmission, a magnetic disk space of a system is sufficiently, and stability of the system is affected.

Based on this, in this embodiment, migration of incremental data is performed in an iterative migration manner.

Specifically, in a data migration process, all of the write operations performed by the client on the to-be-migrated data shard are recorded in different log files, so as to form incremental data in the to-be-migrated data shard in each log file. Correspondingly, the target data node can perform iterative migration of incremental data each time according to each log file.

Further, data volumes of incremental data recorded in respective log files are inconsistent. Preferably, a data volume of incremental data recorded in a log file used in each time of iteration is less than a data volume of incremental data recorded in a log file used in previous iteration. In other words, a data volume of incremental data recorded in a log file used in final iteration is the least.

Still further, reduction of a data volume of incremental data recorded in each log file is controlled by the service end, and the data volume can be reduced randomly or according to a preset data volume.

Figure 5:
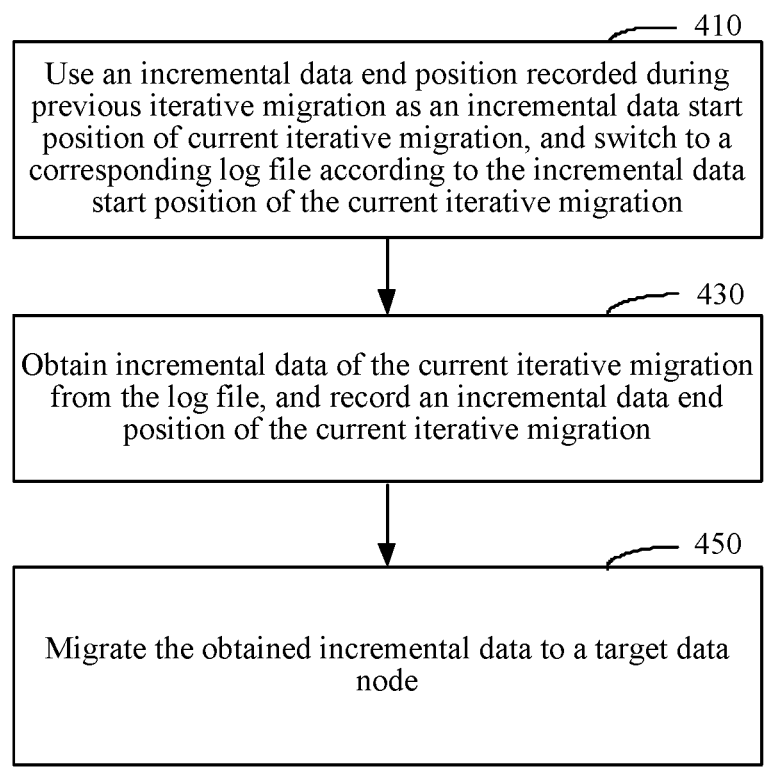
FIG. 5 is a flowchart of a step of performing iterative migration of the incremental data by switching the several log files in an embodiment.

Further, referring to FIG. 5, in an exemplary embodiment, the step of performing iterative migration of incremental data by switching several log files in an embodiment may include the following steps:

Step 410: Use an end-position of incremental data during previous iterative migration as a beginning-position of incremental data for current iterative migration, and switch to the corresponding log file according to the beginning-position of incremental data for the current iterative migration.

Incremental data recorded in each log file has a corresponding beginning-position of incremental data and a corresponding end-position of incremental data, and the beginning-position of incremental data and the end-position of incremental data correspond to an iteration round of the log file. It could be understood that because log files are sequentially generate, correspondingly, an end-position of incremental data of current iterative migration is also a beginning-position of incremental data for next iterative migration. To be specific, migration of incremental data before the end-position of incremental data of the current iterative migration in the log file is completed in current iteration, and incremental data following the end-position of incremental data is migrated in subsequent iterative migration.

Based on this, after the end-position of incremental data during previous iterative migration is obtained, a beginning-position of incremental data for current iterative migration can be determined, so as to obtain a log file corresponding to the current iteration.

Step 430: Obtain incremental data of the current iterative migration from the log file, and record an end-position of incremental data of the current iterative migration.

After a log file corresponding to the beginning-position of incremental data for the current iterative migration is switched to, incremental data recorded therein can be obtained and is used as incremental data of the current iterative migration.

Further, because data volumes of incremental data recorded in respective log filed are inconsistent, that is, the respective log files all have different end-positions of incremental data and end-positions of incremental data, when migration of the incremental data of the current iterative migration is completed, an end-position of incremental data of the current iterative migration is further recorded for use in subsequent iterative migration.

In one embodiment, each iteration of the iterative migration may deal with one single log file. In other embodiment, any iteration of the iterative migration may deal with one or more log files.

Step 450: Migrate the obtained incremental data to the target data node. In this embodiment, migration of the incremental data is completed by presetting a storage space, that is, the obtained incremental data is imported from the source data node to the preset storage space, and then is exported from the preset storage space to the target data node.

The preset storage space is disposed independently of the database cluster, so as to avoid occupying a storage space of the database cluster, is beneficial to alleviating a hungry symptom and improving stability of the system, and can implement decoupling between the data migration and the database cluster and prevent a database service form being interrupted in a data migration process, thereby effectively improving access efficiency of users and improving access experience of the users.

Figure 6:
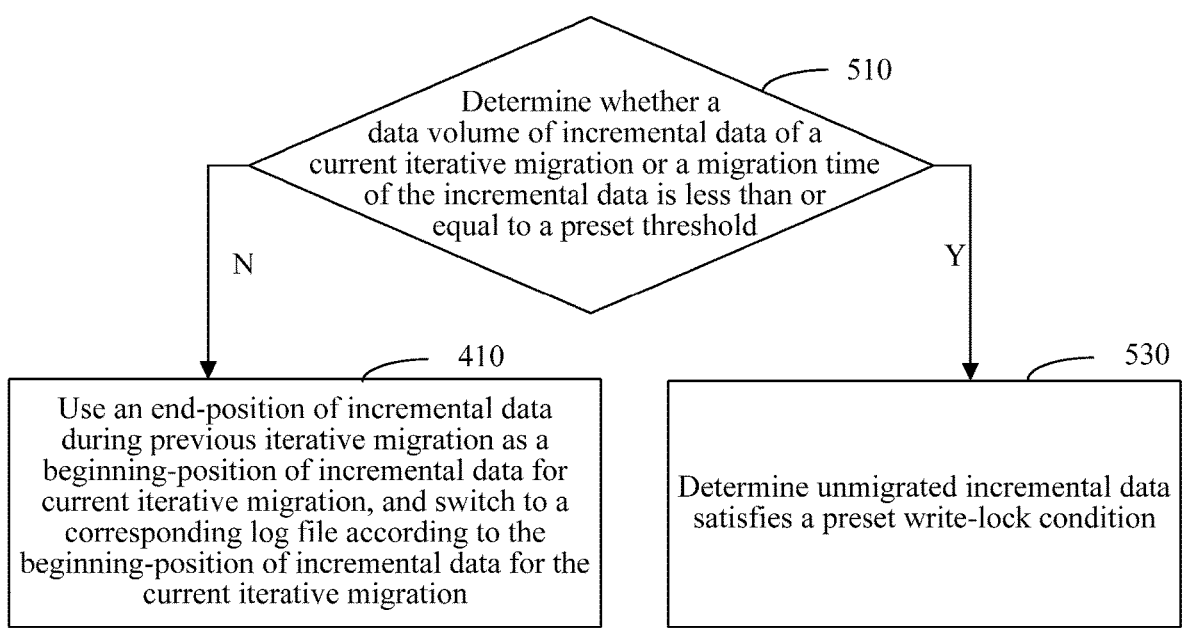
FIG. 6 is a flowchart of a step of performing iterative migration of the incremental data by switching the several log files in another embodiment.

Referring to FIG. 6, in an exemplary embodiment, the step of performing iterative migration of incremental data by switching several log files in an embodiment may include the following steps:

Step 510: Determine whether a data volume of incremental data of a current iterative migration or a migration time of the incremental data is less than or equal to a preset threshold.

In one embodiment, the preset threshold may be a preset volume threshold and thus, it may be determined whether the data volume of incremental data of the current iterative migration is less than or equal to the preset volume threshold. In another embodiment, the preset threshold may be a preset time threshold and thus, it may be determined whether the migration time of the incremental data of the current iterative migration is less than or equal to the preset time threshold.

As stated above, because a database service is not stopped in a data migration process, the client sill performs a write operation on data in the to-be-migrated data shard in the source data node. If the write operation on the to-be-migrated data shard in the source data node is not locked, incremental data is continuously generated, and full migration of incremental data cannot be ensured.

If direct migration is performed, whether it is needed to lock a write operation on the to-be-migrated data shard in the source data node is determined by using unmigrated incremental data in a buffer space established and connected between the source data node and the target data node at a specific moment. For example, at a specific moment, when a data volume of the unmigrated incremental data in the buffer space is less than a preset threshold, it is determined that it is needed to perform a write-lock operation on the to-be-migrated data shard.

However, in the iterative migration process, because when the current iterative migration is performed, recording incremental data in a log file is not stopped, that is, log files are continuously generated, the service end cannot learn how much the unmigrated incremental data is, and further cannot directly determine, by using the unmigrated incremental data, whether it is needed to perform a write-lock operation on the to-be-migrated data shard.

Further, as stated above, if a data volume of incremental data recorded in a log file used in each time of iteration is less than a data volume of incremental data recorded in a log file used in previous iteration, a data volume of incremental data recorded in a log file used in final iteration is the least.

Based on this, in this embodiment, the preset write-lock condition is set to be that a data volume of incremental data of current iterative migration is less than or equal to a preset threshold. To be specific, whether unmigrated incremental data satisfies a write-lock condition is indirectly determined by using incremental data of current iterative migration, so as to further determine whether a write-lock operation needs to be performed on the to-be-migrated data shard.

If the data volume of the incremental data of the current iterative migration is less than or equal to the preset threshold, the data volume of the incremental data of the final iterative migration, that is, the unmigrated incremental data, is certainly less than or equal to the preset threshold. In this case, step 530 is performed to determine that unmigrated incremental data satisfies a preset write-lock condition.

It could be understood that there may be one log file or several log files that needs or need to be switched in the final iterative migration.

Otherwise, step 410 is performed again to continuously perform iterative migration of the incremental data.

Alternatively, a preset write-lock condition may be set to be that a migration time of incremental data of current iterative migration is less than or equal to a preset threshold, the migration time is a time consumed by the target data node for renewing incremental data and is obtained by calculating a ratio of the data volume of the incremental data of the current iterative migration to a speed at which the target data node renews the incremental data. For example, if a typical write-lock time length that is unperceived by a client ranges from 10 ms to 30 ms, the preset write-lock condition may be set to be that a time of renewing incremental data of current iterative migration is less than or equal to 10 ms.

If the migration time of the incremental data of the current iterative migration is less than or equal to the preset threshold, the migration time of the incremental data of the final iterative migration, that is, the unmigrated incremental data, is certainly less than or equal to the preset threshold. In this case, step 530 is performed to determine that unmigrated incremental data satisfies a preset write-lock condition.

Otherwise, step 410 is performed again to continuously perform iterative migration of the incremental data.

In an exemplary embodiment, the foregoing method may further include the following step:

When the switching of the route corresponding to the to-be-migrated data shard is completed, the source data node is instructed to perform an unlock operation on the to-be-migrated data shard and recording the incremental data in the to-be-migrated data shard is stopped.

By performing an unlock operation on the to-be-migrated data shard, the write-lock operation performed on the to-be-migrated data shard can be released, so that read-write operations on the to-be-migrated data shard are recovered, that is, subsequent read-write operations performed by the client on the to-be-migrated data shard are switched from the source data node to the target data node.

Further, after the switching is completed, the source data node no longer generates incremental data about the to-be-migrated data shard. Therefore, the source data node also does not need to continuously record incremental data in the to-be-migrated data shard based on the snapshot. So far, migration of incremental data is completed.

Figure 7A:
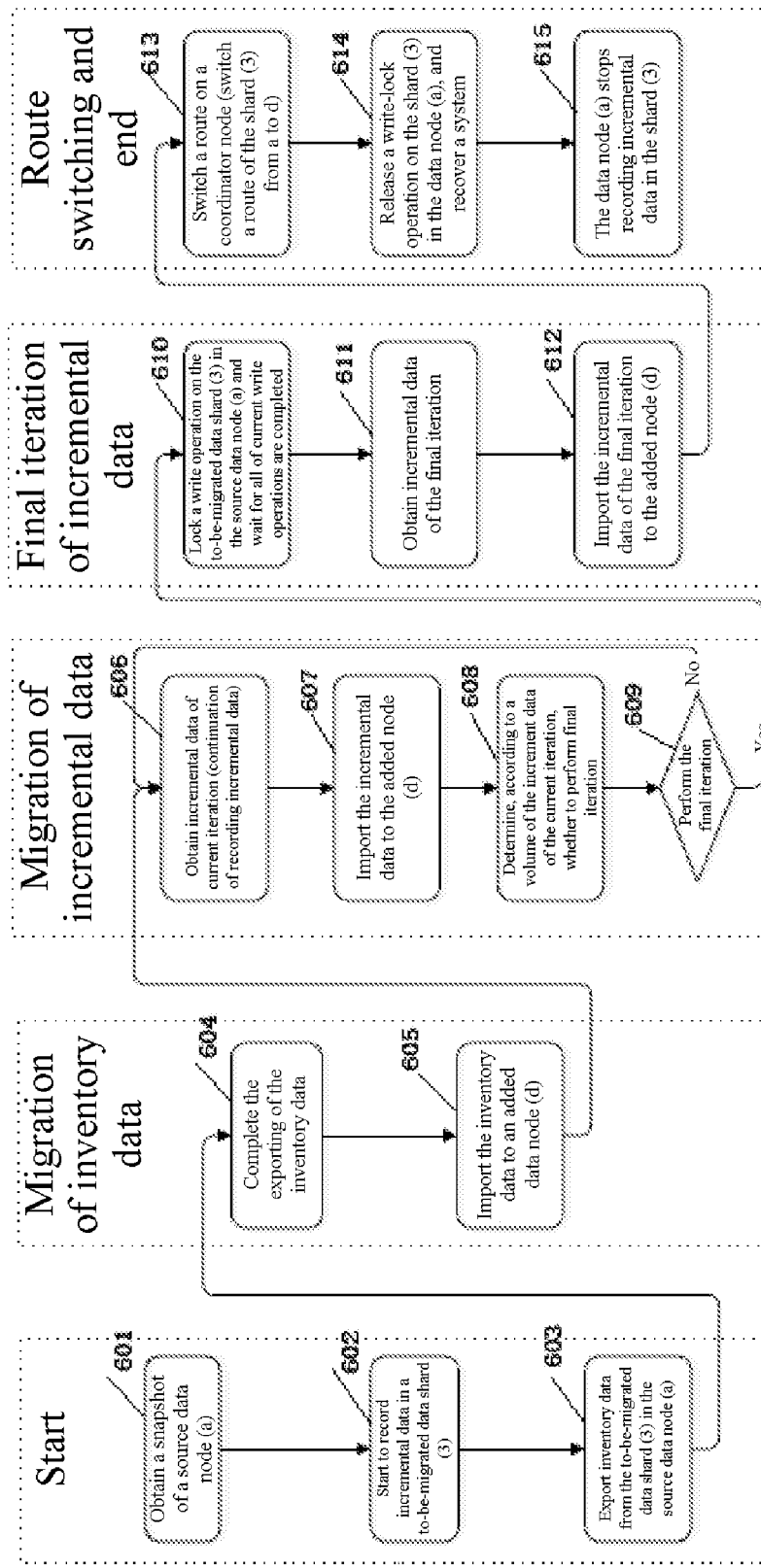
FIG. 7a is a schematic diagram of a specific implementation of a method for data migration in a database cluster in an application scenario.
Figure 7B:
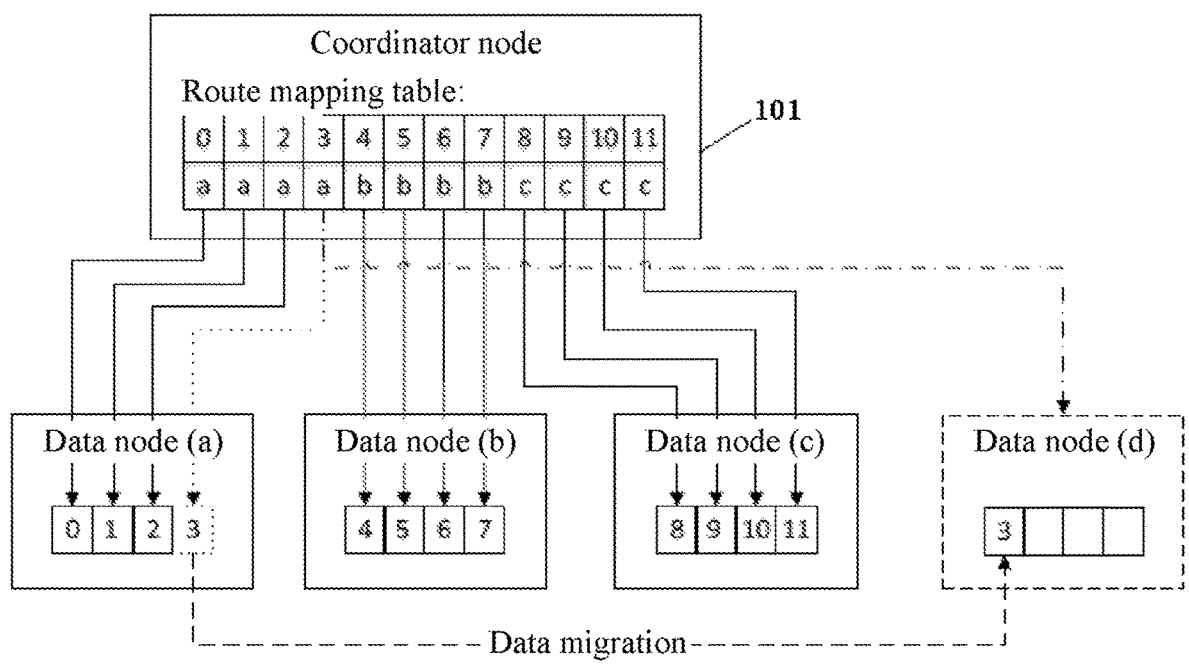

FIG. 7a is a schematic diagram of a specific implementation of a method for data migration in a database cluster in an application scenario, and FIG. 7b is a schematic diagram of data node addition included in FIG. 7a. A data migration process in a database cluster in respective embodiments of the present disclosure is described by using database cluster capacity expansion, that is, addition of a data node d, as an example with reference to the specific application scenario shown in FIG. 7a and the schematic diagram of the data node addition shown in FIG. 7b.

A service end performs step 601 to obtain a snapshot of a source data node a, and based on the snapshot, performs step 602 to start to record incremental data in a to-be-migrated data shard 3 in the source data node a. Meanwhile, step 603 is performed to start to export inventory data from the to-be-migrated data shard 3 in the source data node a.

After the foregoing steps are completed, data migration can be started.

First, step 604 and step 605 are performed to migrate the inventory data in the to-be-migrated data shard 3 from the source data node a to a target data node d.

Then, incremental data in the to-be-migrated data shard 3 is migrated in an iterative migration manner.

Step 606 and step 607 are performed to complete current iterative migration of the incremental data in the to-be-migrated data shard 3. After the current iterative migration is completed, step 608 and step 609 are performed to determine whether to perform final iterative migration.

If not, step 606 is performed again to continue non-final iterative migration of the incremental data.

Otherwise, step 610 is performed to perform a write-lock operation on the to-be-migrated data shard 3, and step 611 and step 612 are performed to: after waiting for all of the current write operations on the to-be-migrated data shard 3 are completed, complete final iterative migration of the incremental data in the to-be-migrated data shard 3.

Finally, step 613 to step 615 are performed to instruct the coordinator node 101 to switch a route corresponding to the to-be-migrated data shard 3 from the source data node a to the target data node d, and recover read-write operations on the to-be-migrated data shard 3, so that all of the subsequent read-write operations performed by the client on the to-be-migrated data shard 3 are switched from the source data node a to the target data node d.

So far, the database cluster completes capacity expansion of the target data node d, and data migration from the source data node a to the target data node d is completed.

In the specific application scenario, not only data capacity expansion unperceived by a client can be supported, that is, during capacity expansion of a database cluster, a database service does not need to be stopped during data migration performed by the database cluster, when a storage capability or processing capability of the database cluster is insufficient to deal with access demands of users, thereby effectively improving access efficiency of users and improving access experience of the user, but also complete transactions can be supported to ensure consistency of data migration.

The following is an apparatus embodiment of the embodiments of the present disclosure, and may be used for performing the method for data migration in a database cluster included in the embodiments of the present disclosure. For details undisclosed in the apparatus embodiment of the embodiments of the present disclosure, refer to the method for data migration in a database cluster included in the embodiments of the present disclosure.

Figure 8:
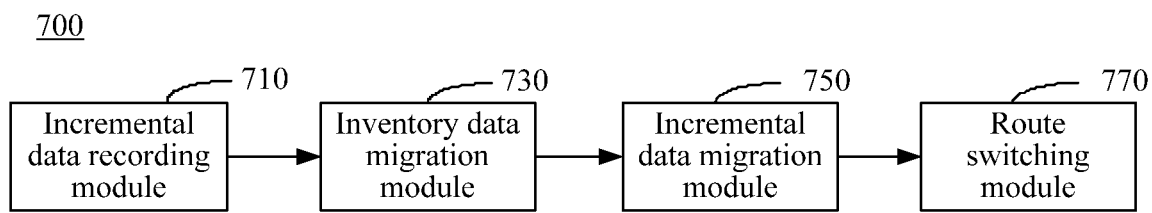
FIG. 8 is a block diagram of an apparatus for data migration in a database cluster according to an exemplary embodiment.

Referring to FIG. 8, in an exemplary embodiment, an apparatus 700 for data migration in a database cluster includes, but is not limited to: one or more memories;

one or more processors, the one or more memories storing one or more instruction modules, configured to be executed by the one or more processors, and the one or more instruction module including: an incremental data recording module 710, an inventory data migration module 730, an incremental data migration module 750, and a route switching module 770.

The incremental data recording module 710 is used for obtaining a snapshot of a source data node, and recording incremental data in a to-be-migrated data shard according to inventory data that is backed up in the snapshot and that is in the to-be-migrated data shard.

The inventory data migration module 730 is used for migrating the backed-up inventory data to the target data node.

The incremental data migration module 750 is used for migrating the recorded incremental data, and during the migration, instructing the source data node to perform a write-lock operation on the to-be-migrated data shard and migrate unmigrated incremental data to the target data node when the unmigrated incremental data satisfies a preset write-lock condition.

The route switching module 770 is used for after the migration of the incremental data is completed, instructing the coordinator node to switch a route corresponding to the to-be-migrated data shard from the source data node to the target data node.

Figure 9:
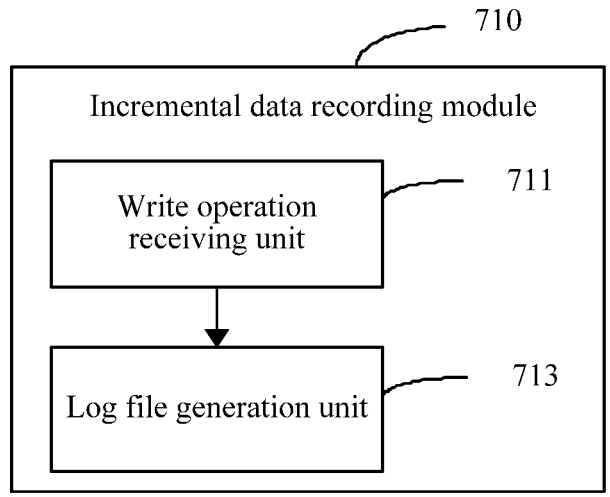
FIG. 9 is a block diagram of an incremental data recording module in a corresponding embodiment in an embodiment.

Referring to FIG. 9, in an exemplary embodiment, the incremental data recording module 710 includes, but is not limited to: a write operation receiving unit 711 and a log file generation unit 713.

The write operation receiving unit 711 is used for receiving, based on the inventory data, several write operations performed by a client on the to-be-migrated data shard.

The log file generation unit 713 is used for generating several log files according to the several write operations, and recording incremental data in the to-be-migrated data shard by using the several log files.

Correspondingly, the incremental data migration module 750 includes: an iterative migration unit.

The iterative migration unit is used for performing iterative migration of the incremental data by switching the several log files.

Figure 10:
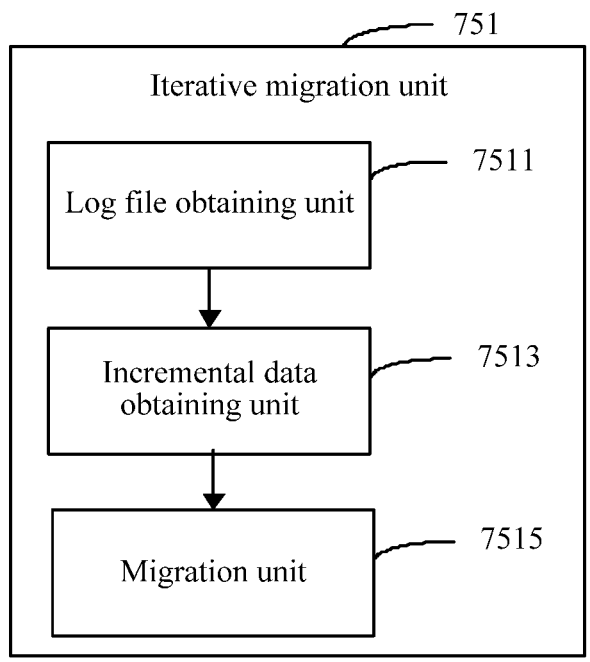
FIG. 10 is a block diagram of an iterative migration unit in an embodiment.

Referring to FIG. 10, in an exemplary embodiment, the iterative migration unit 751 includes, but is not limited to: a log file obtaining unit 7511, an incremental data obtaining unit 7513, and a migration unit 7515.

The log file obtaining unit 7511 is used for using an end-position of incremental data during previous iterative migration as a beginning-position of incremental data for current iterative migration, and switching to the corresponding log file according to the beginning-position of incremental data for the current iterative migration.

The incremental data obtaining unit 7513 is used for obtaining the incremental data of the current iterative migration from the log file, and recording an end-position of incremental data of the current iterative migration.

The migration unit 7515 is used for migrating the obtained incremental data to the target data node.

In an exemplary embodiment, the iterative migration unit 751 further includes, but is not limited to: a determining unit.

The determining unit is used for determining whether a data volume of the incremental data of the current iterative migration or a migration time of the incremental data is less than or equal to a preset threshold.

In an exemplary embodiment, the foregoing apparatus further includes, but is not limited to: an unlocking module.

The unlocking module is used for: instructing the source data node to perform an unlock operation on the to-be-migrated data shard and stopping recording the incremental data in the to-be-migrated data shard when the switching of the route corresponding to the to-be-migrated data shard is completed.

By means of the technical solutions and apparatus of this application, it can be implemented that during data migration, the source data node is instructed to perform a write-lock operation on the to-be-migrated data shard when unmigrated incremental data satisfies a preset write-lock condition and migrate the unmigrated incremental data to the target data node when all of the current write operations on the to-be-migrated data shard are completed. Although a write operation performed by the client on to-be-migrated data shard fails or is blocked after the write-lock operation is performed on the to-be-migrated data shard, there is an extremely small volume of unmigrated incremental data satisfying the preset write-lock condition, so that a time of a write operation failure or blockage is extremely short, and is unperceived by a client, so as to avoid stopping a database service in a data migration process, thereby effectively improving access efficiency of users and improving access experience of the users.

It should be noted that, when the apparatus for data migration in a database cluster provided in the foregoing embodiment performs data migration in a database cluster, only division of the foregoing functional modules is described by using an example. During actual application, the foregoing functions may be allocated to and completed by different functional modules according to requirements, that is, the internal structure of the apparatus for data migration in a database cluster is divided into different functional modules, to complete all or some of the foregoing described functions.

In addition, the apparatus for data migration in a database cluster according to the foregoing embodiments and the embodiments of the method for data migration in a database cluster belong to the same concept. The specific manners in which respective modules perform operations are described in detail in the method embodiments, and the details are not described herein again.

The content above is merely preferred exemplary embodiments in the embodiments of the present disclosure, and is not used for limiting implementations of the embodiments of the present disclosure. A person skilled in the art can make corresponding adaptations or modifications conveniently according to the main concept and spirit of the embodiments of the present disclosure, so that the protection scope of the embodiments of the present disclosure is subject to the protection scope of the claims.

What is claimed is:

1. A method for data migration in a database cluster, the method comprising:
    obtaining, by a device comprising a memory and a processor in communication with the memory, a snapshot of a source data node of a database cluster;
    recording, by the device, incremental data in a to-be-migrated data shard in the source data node according to inventory data that is backed up in the snapshot and that is in the to-be-migrated data shard;
    migrating, by the device, the inventory data to a target data node of the database cluster;
    migrating, by the device, the incremental data by performing, by the device, iterative migration of the incremental data when writing to the to-be-migrated data shard is allowed before a preset write-lock condition is met;
    determining whether the preset write-lock condition is met by determining whether a data volume of the incremental data of an instant iterative migration is less than or equal to a preset volume threshold;
    in response to determination that the data volume of the incremental data of the instant iterative migration larger than the preset volume threshold, continuously performing, by the device, the iterative migration of the incremental data;
    during migrating the incremental data, instructing the source data node to, in response to the data volume of the incremental data of the instant iterative migration being less than or equal to the preset volume threshold, perform a write-lock operation on the to-be-migrated data shard and migrate rest of unmigrated incremental data to the target data node after the write-lock operation is performed, the write-lock operation preventing the to-be-migrated data shard from being written; and
    after the rest of the unmigrated incremental data is migrated to the target data node, instructing, by the device, a coordinator node of the database cluster to switch a route corresponding to the to-be-migrated data shard from the source data node to the target data node.

2. The method according to claim 1, wherein recording the incremental data in the to-be-migrated data shard according to the inventory data that is backed up in the snapshot and that is in the to-be-migrated data shard comprises:
    receiving, by the device based on the inventory data, at least one write operation performed by a client on the to-be-migrated data shard;
    generating, by the device, at least one log file according to the at least one write operation; and recording, by the device, the incremental data in the to-be-migrated data shard by using the at least one log file.

3. The method according to claim 1, wherein performing the iterative migration of the incremental data comprises:
using, by the device, an end-position of incremental data during previous iterative migration as a beginning-position of incremental data for current iterative migration, and switching to a log file according to the beginning-position of incremental data for the current iterative migration;
obtaining, by the device, incremental data of the current iterative migration from the log file, and recording an end-position of incremental data of the current iterative migration; and
migrating, by the device, the obtained incremental data of the current iterative migration to the target data node.

4. The method according to claim 1, further comprising:
when the switching of the route corresponding to the to-be-migrated data shard from the source data node to the target data node is completed, instructing, by the device, the source data node to perform an unlock operation on the to-be-migrated data shard and stop recording the incremental data in the to-be-migrated data shard.

5. An apparatus for data migration in a database cluster, the apparatus comprising:
a memory storing instructions; and
a processor in communication with the memory, wherein, when the processor executes the instructions, the processor is configured to cause the apparatus to:
obtain a snapshot of a source data node of a database cluster,
record incremental data in a to-be-migrated data shard in the source data node according to inventory data that is backed up in the snapshot and that is in the to-be-migrated data shard,
migrate the inventory data to a target data node of the database cluster,
migrate the incremental data by performing iterative migration of the incremental data when writing to the to-be-migrated data shard is allowed before a preset write-lock condition is met,
determine whether the preset write-lock condition is met by determining whether a data volume of the incremental data of an instant iterative migration is less than or equal to a preset volume threshold;
in response to determination that the data volume of the incremental data of the instant iterative migration larger than the preset volume threshold, continuously perform the iterative migration of the incremental data;
during migrating the incremental data, instruct the source data node to, in response to the data volume of the incremental data of the instant iterative migration being less than or equal to the preset volume threshold, perform a write-lock operation on the to-be-migrated data shard and migrate rest of unmigrated incremental data to the target data node after the write-lock operation is performed, the write-lock operation preventing the to-be-migrated data shard from being written; and
after the rest of the unmigrated incremental data is migrated to the target data node, instruct a coordinator node of the database cluster to switch a route corresponding to the to-be-migrated data shard from the source data node to the target data node.

6. The apparatus according to claim 5, wherein, when the processor is configured to cause the apparatus to record the incremental data in the to-be-migrated data shard according to the inventory data that is backed up in the snapshot and that is in the to-be-migrated data shard, the processor is configured to cause the apparatus to:
receive, based on the inventory data, at least one write operation performed by a client on the to-be-migrated data shard;
generate at least one log file according to the at least one write operation; and
record the incremental data in the to-be-migrated data shard by using the at least one log file.

7. The apparatus according to claim 5, wherein, when the processor is configured to cause the apparatus to perform the iterative migration of the incremental data, the processor is configured to cause the apparatus to:
use an end-position of incremental data during previous iterative migration as a beginning-position of incremental data for current iterative migration, and switch to a log file according to the beginning-position of incremental data for the current iterative migration;
obtain incremental data of the current iterative migration from the log file, and record an end-position of incremental data of the current iterative migration; and
migrate the obtained incremental data of the current iterative migration to the target data node.

8. The apparatus according to claim 5, wherein, when the processor executes the instructions, the processor is configured to further cause the apparatus to:
when the switching of the route corresponding to the to-be-migrated data shard from the source data node to the target data node is completed, instruct the source data node to perform an unlock operation on the to-be-migrated data shard and stop recording the incremental data in the to-be-migrated data shard.

9. A non-transitory computer readable storage medium storing instructions, wherein the instructions, when executed by a processor, cause the processor to perform:
obtaining a snapshot of a source data node of a database cluster;
recording incremental data in a to-be-migrated data shard in the source data node according to inventory data that is backed up in the snapshot and that is in the to-be-migrated data shard;
migrating the inventory data to a target data node of the database cluster;
migrating the incremental data by performing iterative migration of the incremental data when writing to the to-be-migrated data shard is allowed before a preset write-lock condition is met;
determining whether the preset write-lock condition is met by determining whether a data volume of the incremental data of an instant iterative migration is less than or equal to a preset volume threshold;
in response to determination that the data volume of the incremental data of the instant iterative migration larger than the preset volume threshold, continuously performing the iterative migration of the incremental data;
during migrating the incremental data, instructing the source data node to, in response to the data volume of the incremental data of the instant iterative migration being less than or equal to the preset volume threshold, perform a write-lock operation on the to-be-migrated data shard and migrate rest of unmigrated incremental data to the target data node after the write-lock operation is performed, the write-lock operation preventing the to-be-migrated data shard from being written; and after the rest of the unmigrated incremental data is migrated to the target data node, instructing a coordinator node of the database cluster to switch a route corresponding to the to-be-migrated data shard from the source data node to the target data node.

10. The non-transitory computer readable storage medium according to claim 9, wherein, when the instructions cause the processor to perform recording the incremental data in the to-be-migrated data shard according to the inventory data that is backed up in the snapshot and that is in the to-be-migrated data shard, the instructions cause the processor to perform:

receiving, based on the inventory data, at least one write operation performed by a client on the to-be-migrated data shard;

generating at least one log file according to the at least one write operation; and recording the incremental data in the to-be-migrated data shard by using the at least one log file.

11. The non-transitory computer readable storage medium according to claim 9, wherein, when the instructions cause the processor to perform performing the iterative migration of the incremental data, the instructions cause the processor to perform:

using an end-position of incremental data during previous iterative migration as a beginning-position of incremental data for current iterative migration, and switching to a log file according to the beginning-position of incremental data for the current iterative migration;

obtaining incremental data of the current iterative migration from the log file, and recording an end-position of incremental data of the current iterative migration; and migrating the obtained incremental data of the current iterative migration to the target data node.

12. The non-transitory computer readable storage medium according to claim 9, wherein the instructions further cause the processor to perform:

when the switching of the route corresponding to the to-be-migrated data shard from the source data node to the target data node is completed, instructing the source data node to perform an unlock operation on the to-be-migrated data shard and stop recording the incremental data in the to-be-migrated data shard.

13. The method according to claim 1, further comprising buffering the incremental data by a connection between the to-be-migrated data shard and the target data node.

14. The apparatus of claim 5, wherein the processor is further configured to cause the apparatus to buffer the incremental data by a connection between the to-be-migrated data shard and the target data node.

15. The non-transitory computer readable storage medium of claim 9, wherein the instructions, when executed by the processor, further cause the processor to perform buffering the incremental data by a connection between the to-be-migrated data shard and the target data node.

* * * * *